(12) United States Patent (10) Patent No.: US 8,336,021 B2
McMurtry et al. (45) Date of Patent: Dec. 18, 2012

(54) MANAGING SET MEMBERSHIP

(75) Inventors: Craig V. McMurtry, Sammamish, WA (US); Nima Ganjeh, Bellevue, WA (US); Vadim Meleshuk, Seattle, WA (US); Stephen J. Pek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1035 days.

(21) Appl. No.: 12/334,838

(22) Filed: Dec. 15, 2008

(65) Prior Publication Data

US 2010/0153932 A1 Jun. 17, 2010

(51) Int. Cl.
G06F 9/44 (2006.01)

(52) U.S. Cl. .......................... 717/101; 717/121; 717/141

(58) Field of Classification Search ........................ None
See application file for complete search history.

(56) References Cited

U.S. PATENT DOCUMENTS

| | | | | |
|---|---|---|---|---|
| 4,839,803 | A * | 6/1989 | Kawashima et al. | 717/121 |
| 5,564,053 | A * | 10/1996 | Yuki et al. | 717/101 |
| 5,960,384 | A * | 9/1999 | Brash | 704/9 |
| 6,243,860 | B1 * | 6/2001 | Holland | 717/141 |
| 6,678,882 | B1 * | 1/2004 | Hurley et al. | 717/121 |
| 7,080,075 | B1 * | 7/2006 | Chan et al. | 1/1 |
| 7,086,042 | B2 | 8/2006 | Abe et al. | |
| 7,107,282 | B1 | 9/2006 | Yalamanchi | |
| 7,213,200 | B2 | 5/2007 | Abe et al. | |
| 2003/0065874 | A1 * | 4/2003 | Marron et al. | 711/100 |
| 2003/0163285 | A1 * | 8/2003 | Nakamura et al. | 702/179 |
| 2004/0010752 | A1 * | 1/2004 | Chan et al. | 715/513 |
| 2004/0060007 | A1 * | 3/2004 | Gottlob et al. | 715/513 |
| 2004/0158602 | A1 * | 8/2004 | Broberg | 709/200 |
| 2004/0215600 | A1 * | 10/2004 | Aridor et al. | 707/3 |
| 2005/0007383 | A1 * | 1/2005 | Potter et al. | 345/619 |
| 2005/0050066 | A1 * | 3/2005 | Hughes | 707/100 |
| 2005/0086633 | A1 * | 4/2005 | Nachmanson et al. | 717/101 |
| 2005/0086641 | A1 * | 4/2005 | Hussey | 717/121 |
| 2005/0091352 | A1 | 4/2005 | Alex et al. | |
| 2005/0097084 | A1 * | 5/2005 | Balmin et al. | 707/3 |
| 2005/0120330 | A1 * | 6/2005 | Ghai et al. | 717/101 |
| 2005/0160410 | A1 * | 7/2005 | Narisawa et al. | 717/141 |
| 2005/0182843 | A1 * | 8/2005 | Reistad et al. | 709/230 |
| 2005/0183073 | A1 * | 8/2005 | Reynolds | 717/141 |
| 2005/0257201 | A1 * | 11/2005 | Rose et al. | 717/136 |
| 2006/0020631 | A1 * | 1/2006 | Cheong Wan et al. | 707/104.1 |
| 2006/0106758 | A1 * | 5/2006 | Chen et al. | 707/2 |

(Continued)

OTHER PUBLICATIONS

Dave Beckett et al. "RDF/XML Syntax Specification (Revised)", W3C , Feb. 10, 2004 , <http://www.w3.org/TR/REC-rdf-syntax/> pp. 1-51.*

(Continued)

*Primary Examiner* — Thuy Dao
*Assistant Examiner* — Samuel Hayim
(74) *Attorney, Agent, or Firm* — Workman Nydegger (57) ABSTRACT

The present invention extends to methods, systems, and computer program products for managing set membership. A set definition is translated into one or more membership conditions. Each membership condition includes statements about the attributes of a resource that are to be true if the resource is to be included in the set. For any given resource request, resources touched by the request are compared to membership conditions applicable to the touched resources. Thus, embodiments of the invention minimize the work that is done to determine which sets a resource may or may not belong to whenever a resource is modified. Accordingly, based on available resources, embodiments of the invention can scale to accommodate larger numbers of sets and larger numbers of potential members of sets.

20 Claims, 5 Drawing Sheets

U.S. PATENT DOCUMENTS

2006/0195560 A1    8/2006  Newport
2010/0153932 A1*   6/2010  McMurtry et al. ............ 717/143

OTHER PUBLICATIONS

L. Stringa, "A New Set of Constraint-Free Character Recognition Grammars", IEEE, 1990, <http://ieeexplore.ieee.org/stamp/stamp.jsp?tp=&arnumber=62612> pp. 1-8.*

Bobby Granville, "Teaching Principles of Fuzzy Logic Analysis Using the BK-Products Model", Consortium for Computing in Small Colleges, 2003, <http://delivery.acm.org/10.1145/770000/767618/p111-granville.pdf> pp. 1-7.*

Gabarra, Mark; "Automating Group Management: A Dynamic Group Primer", Aug. 21, 2008, 9 pages.

Microsoft Technet, "Managing and Locating Resources", 2008, 12 pages.

Kotsovinos, Evangelos, et al., "Role-Based Resource Management", In Proceedings of the 8th CaberNet Radicals Workshop, Oct. 2003, France, 5 pages.

Meier, Wolfgang M., "User Authentication and Access Control", Based on information and belief available, at least as early as Oct. 10, 2008, 8 pages.

* cited by examiner

401 - <Membership Condition> ::= <Membership Condition Statements>
402 - <Membership Condition Statements> ::= <Membership Condition Statement> | <Membership Condition Statements>
403 - <Membership Condition Statement> ::= <Referent> <Attribute> <Operator> <Value>
404 - <Referent> ::= <Referent Reference> <Attribute>
405 - <Referent Reference> ::= <Target Referent Reference> | <Referent>
406 - <Target Referent Reference> ::= Indicates that the <Attribute> of the referent refers to an attribute of the resource for which the truth of the statement is currently being evaluated.
407 - <Attribute> ::= The name of an attribute of the resource identified by the expression to its left.
408 - <Operator> ::= <Relational Operator> | <Inverted Operator>
409 - <Relational Operator> ::= <Equals Operator> | <Greater Than Operator> | <Less Than Operator> | <Like Operator>
410 - <Equals Operator> ::= Asserts that the value of the expression to its left is equal to the value of the expression to its right.
411 - <Greater Than Operator> ::= Asserts that the value of the expression to its left is greater than the value of the expression to its right.
412 - <Less Than Operator> ::= Asserts that the value of the expression to its left is less than the value of the expression to its right.
413 - <Like Operator> ::= Asserts that the value of the expressions to its left and right are string, and that the value of the expression to its left contains the value of the expression to its right.
414 - <Inverted Operator> ::= <Not Operator> <Relational Operator>
415 - <Not Operator> ::= Asserts the inverse of the operator to its right.
416 - <Value> ::= <Literal Value> | <Function Value> | <De-referenced Value>
417 - <Literal Value> ::= <Literal Boolean Value> | <Literal Time Value> | <Literal Integer Value> | <Literal Reference Value> | <Literal String Value>
418 - <Literal Boolean Value> ::= 0 | 1
419 - <Literal Time Value> ::= a date and time
420 - <Literal Integer Value> ::= a 64-bit integer
421 - <Literal Reference Value> ::= the unique identifier of a resource
422 - <Literal String Value> ::= a string of characters
423 - <Function Value> ::= <Literal Value> <Function Name>
424 - <Function Name> ::= The name of some function that may be performed on the literal value to its left.
425 - <Filtered Value> ::= <Filtered Attribute Value> | <Recursively Filtered Attribute Value>
426 - <Filtered Attribute Value> ::= <Filter> <Attribute>
427 - <Filter> ::= An executable filter expression matching zero or more resources.
428 - <Recursively Filtered Attribute Value> ::= <Filtered Attribute Value> <Recursively Filtered Attribute> <Recursion Directions>
429 - <Recursively Filtered Attribute> ::= <Attribute>
430 - <Recursion Directions> ::= <Recursion To> <Recursion From>
431 - <Recursion To> ::= <Literal Boolean Value>
432 - <Recursion From> ::= <Literal Boolean Value>

FIG. 4

MANAGING SET MEMBERSHIP

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

One task computer systems are often assigned to perform is determining set membership. In some environments, set membership must be appropriately maintained over time. For example, a computer system might have to maintain a list of users that are in a group for security purposes.

Generally, a set is a collection of resources defined by a filter. Given a correctly populated set, when a request is made to modify a resource that may or may not be a member of the set, it is necessary to determine whether the resource will be a member of the set after the request has been processed. The simplest way of doing that would be to apply the filter (e.g., through a query) after completing the request, to determine whether the updated resource matches the filter or not.

However, there are at least two shortcomings to applying filters to maintain set membership. A first shortcoming of this approach is that every filter for every set would have to be executed. Having to do that could be very time-consuming. The more sets there are, the more queries would have to be executed. Consequently, using filters does not scale to accommodate large numbers of sets. Moreover, if some sets are defined in terms of the membership of others, the filters would have to be executed in a particular order, if the correct results were to be produced.

A second shortcoming is that some requests may be prohibited based on whether or not the request would cause the resource to transition in or out of a particular set. In that case, one would need to know whether or not the resource to be modified by a request will transition in or out of the set before completing the request. Therefore, applying filters is not optimally flexible for maintaining set membership.

BRIEF SUMMARY

The present invention extends to methods, systems, and computer program products for managing set membership. In some embodiments, a collection of set membership conditions is formulated for a set. A computer system accesses a set definition for a set. The set definition defines what resources are to be included in the set. The computer system accesses a membership condition grammar. The membership condition grammar generally indicates how to translate a set definition for a set into membership conditions indicative of membership in the set.

The computer system translates the accessed set definition into one or more corresponding membership conditions defined in accordance with the membership condition grammar. Each membership condition includes one or more membership condition statements. Each membership condition statement defines conditions about a resource's attributes that is to be true for the resource to be considered for membership in the set.

For each membership condition statement, a portion of the set definition is decomposed into a referent field, an attribute field, an operator field, and a value field that collectively represent the membership condition statement. The attribute field names an attribute. The operator filed indicates a relational operation. The value field represents a value. The referent field refers either directly to the resource currently being evaluated for membership in the set or to another resource that is related in some way, to the resource that is currently being evaluated for membership in the set. The computer system stores the one or more corresponding membership conditions for use in subsequently determining membership in the set.

In other embodiments, it is determined if a reference that is to be created or modified is a member of a set. A computer system receives a request to create or modify a specified resource. The computer system accesses one or more membership conditions for the set. The one or more membership conditions were previously translated from a set definition defining the set. When the specified resource matches at least one of the one or more membership conditions the specified resource is indicating as a member of the set. Each membership condition includes one or more membership condition statements that are to be satisfied for a resource to match the membership condition Each membership condition statement includes a referent field, an attribute field, an operator field, and a value field that collectively represent the membership condition statement. The attribute field names an attribute. The operator field indicates a relational operator. The value field represents a value. The referent field refers either directly to the resource currently being evaluated for membership in the set or to another resource that is related in some way to the resource that is currently being evaluated for membership in the set.

For each of the one or more membership condition statements, the computer system evaluates the named attribute of the specified resource against the value in the value field in view of the operator in the operator field to determine if the specified resource satisfies the membership condition statement. The computer system determines that the specified resource satisfies membership condition statements for at least one of membership conditions based on the evaluations. The computer system matches the specified resource to the condition statement as a result of the specified resource satisfying membership condition statements for the at least one of the membership conditions. The computer system includes the specified resource as a member of the set in response to the specified resource matching the condition statement.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates an example membership condition grammar.

DETAILED DESCRIPTION

The present invention extends to methods, systems, and computer program products for managing set membership. In some embodiments, a collection of set membership conditions is formulated for a set. A computer system accesses a set definition for a set. The set definition defines what resources are to be included in the set. The computer system accesses a membership condition grammar. The membership condition grammar generally indicates how to translate a set definition for a set into membership conditions indicative of membership in the set.

The computer system translates the accessed set definition into one or more corresponding membership conditions defined in accordance with the membership condition grammar. Each membership condition includes one or more membership condition statements. Each membership condition statement defines a condition about a resource's attributes that is to be true for the resource to be considered for membership in the set.

For each membership condition statement, a portion of the set definition is decomposed into a referent field, an attribute field, an operator field, and a value field that collectively represent the membership condition statement. The attribute field names an attribute. The operator filed indicates a relational operation. The value field represents a value. The referent field refers either directly to the resource currently being evaluated for membership in the set or to another resource that is related in some way, to the resource that is currently being evaluated for membership in the set. The computer system stores the one or more corresponding membership conditions for use in subsequently determining membership in the set.

In other embodiments, it is determined if a reference that is to be created or modified is a member of a set. A computer system receives a request to create or modify a specified resource. The computer system accesses one or more membership conditions for the set. The one or more membership conditions were previously translated from a set definition defining the set. When the specified resource matches at least one of the one or more membership conditions the specified resource is indicating as a member of the set. Each membership condition includes one or more membership condition statements that are to be satisfied for a resource to match the membership condition Each membership condition statement includes a referent field, an attribute field, an operator field, and a value field that collectively represent the membership condition statement. The attribute field names an attribute. The operator field indicates a relational operator. The value field represents a value. The referent field refers either directly to the resource currently being evaluated for membership in the set or to another resource that is related in some way to the resource that is currently being evaluated for membership in the set.

For each of the one or more membership condition statements, the computer system evaluates the named attribute of the specified resource against the value in the value field in view of the operator in the operator field to determine if the specified resource satisfies the membership condition statement. The computer system determines that the specified resource satisfies membership condition statements for at least one of membership conditions based on the evaluations. The computer system matches the specified resource to the condition statement as a result of the specified resource satisfying membership condition statements for the at least one of the membership conditions. The computer system includes the specified resource as a member of the set in response to the specified resource matching the condition statement.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
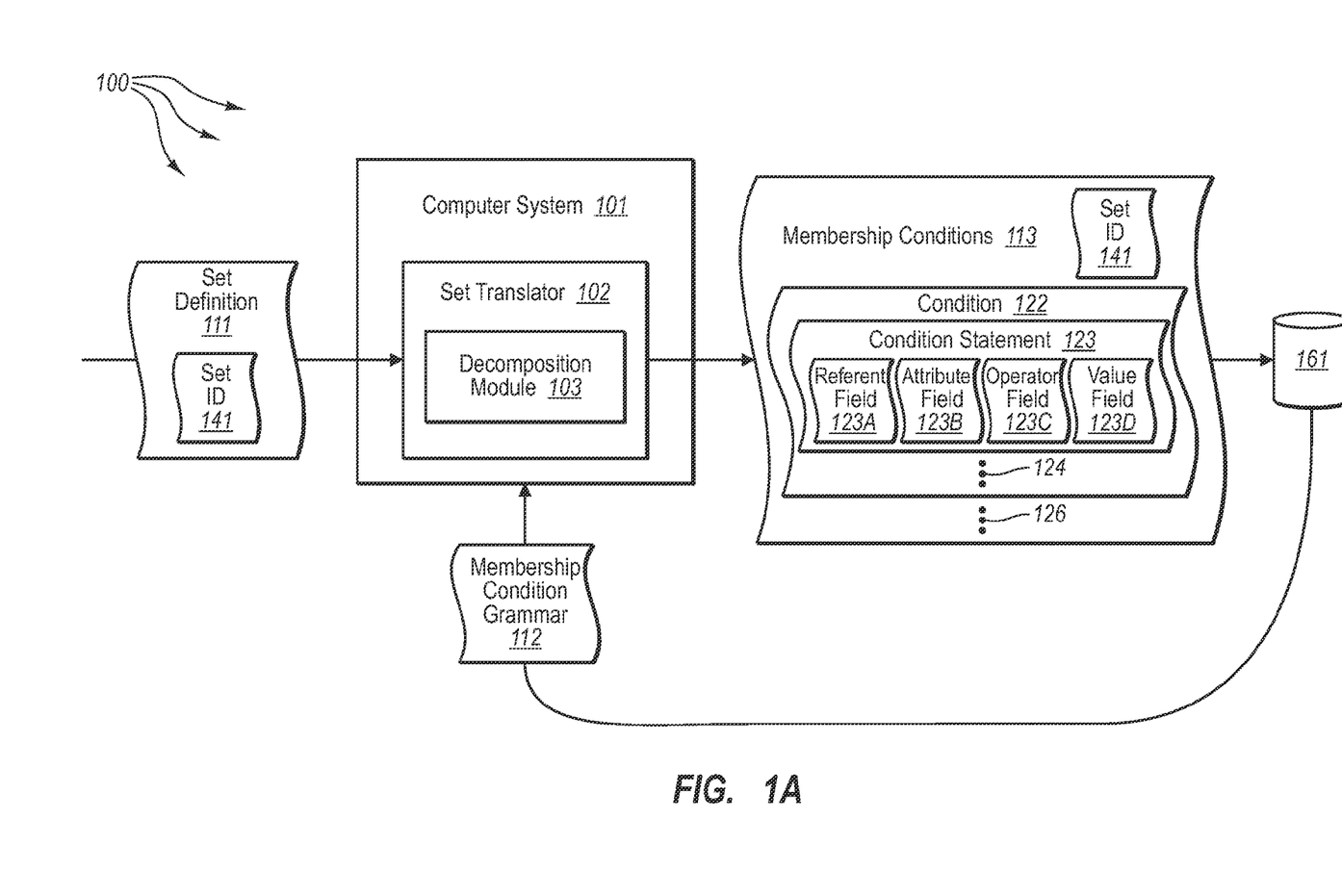
FIG. 1A illustrates an example computer architecture that facilitates formulating a collection of set membership conditions for a set from a set definition.

FIG. 1A illustrates an example computer architecture 100 that facilitates formulating a collection of set membership conditions for a set from a set definition. Referring to FIG. 1A, computer architecture 100 includes computer system 101. Computer systems 101 can be connected to other computer systems over (or be part of) a network, such as, for example, a Local Area Network ("LAN"), a Wide Area Network ("WAN"), and even the Internet. Accordingly, computer system 101 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, computer system 101 includes set translator 102. Set translator 102 is configured to access a set definition (e.g., a query or other filter) for a set and a membership grammar. Set translator 102 is further configured to translate the accessed set definition into membership conditions defined in accordance with the membership condition grammar.

Set translator 102 further includes decomposition module 103. Decomposition module 103 is configured to decompose a portion of an accessed set definition into fields that collectively represent a membership condition statement. In some embodiments, a membership set condition includes a referent field, an attribute field, an operator field, and a value field. Set translator 102 can store membership conditions for a set in physical storage media.

Figure 2:
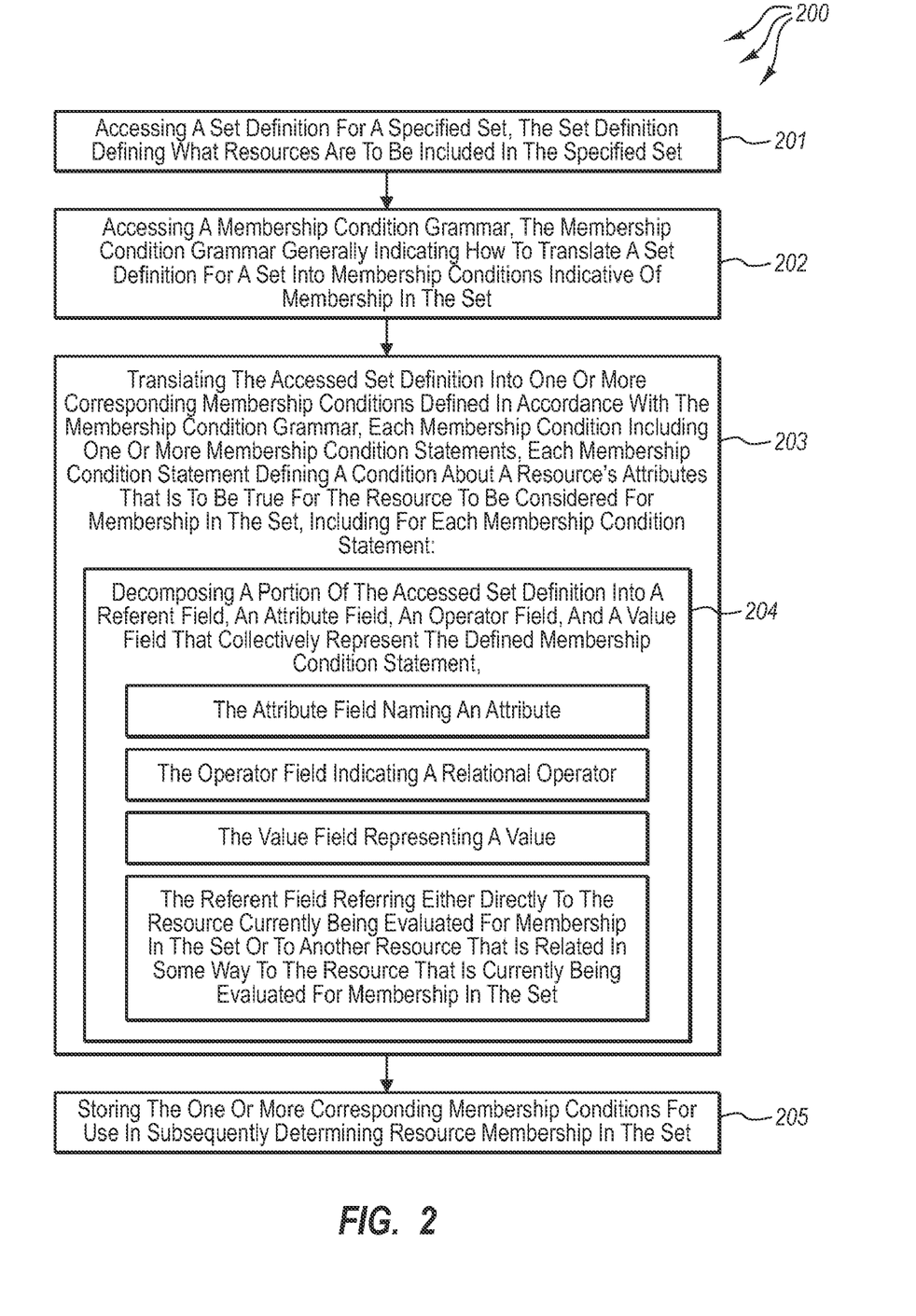
FIG. 2 illustrates a flow chart of an example method for formulating a collection of set membership conditions for a set definition.

FIG. 2 illustrates a flow chart of an example method 200 for formulating a collection of set membership conditions for a set definition. Method 200 will be described with respect to the components and data depicted in computer FIG. 1A.

Method 200 includes an act accessing a set definition for a specified set, the set definition defining what resources are to be included in the specified set (act 201). For example, set translator 102 can access set definition 111. Set definition 111 can be a filter (e.g., query, XPath filter expression, etc) that can be applied to a set of resources to reduce the set of resources into a subset of resources that satisfy the filter. (XPath, as is well-known in the art, is a query language as defined by the World Wide Web Consortium (W3C).) For example, the XPath filter expression, "/Person[Name='x']", can be used to filter a set of resources into a subset of resources of the type 'Person' that have a name value of Set ID 141 is an identifier that can be assigned to resources that satisfy the filter of set definition 111.

Method 200 includes an act of accessing a membership condition grammar, the membership condition grammar generally indicating how to translate a set definition for a set into membership conditions indicative of membership in the set (act 202). For example, translator 102 can access membership condition grammar 112. Generally, a membership condition grammar can indicate that a membership condition include one or more membership statements of a specified form. The specified form for membership statements can also be further defined through additional definitions with the membership condition grammar.

Method 200 includes an act of translating the accessed set definition into one or more corresponding membership conditions defined in accordance with the membership condition grammar, each membership condition including one or more membership condition statements, each membership condition statement defining a condition about a resource's attributes that is to be true for the resource to be considered for membership in the set (act 203). For example, set translator 102 can translate set definition 111 into membership conditions 113 defined in accordance with membership condition grammar 112. Each membership condition in membership conditions 113 can include one more membership condition statements. For example, condition 122 includes condition statement 123. Ellipsis 124 represents that condition 122 can include one or more other membership condition statements, in addition to condition statement 123. Each membership condition statement included in condition 122, including condition statement 123, defines a condition about a resource's attributes that is to be true for the resource to be considered for membership in a set defined by set definition 111. Generally, a membership condition statement asserts that a particular attribute of a resource has a certain value or falls within a range of values.

Ellipsis 126 represents that membership conditions 113 can include one or more other conditions, in addition to condition 122. Each of these other conditions can also include one or more membership condition statements.

In some embodiments, a membership condition grammar defines a membership condition statement to include various fields that can be used for comparison against a resource and its attributes to determine set membership. Although virtually any of membership condition grammar can be used. FIG. 4 illustrates an example membership condition grammar 400. The numbers in FIG. 4 represent line numbers for reference purposes but are not part of the actual membership set grammar.

Referring now to FIG. 4, line numbers 401 and 402 collectively indicate that a membership condition includes one or more membership condition statements. As depicted on line 403, a membership condition grammar 400 defines: <Membership Condition Statement>::=<Referent><Attribute><Operator><Value>. Lines 404-406 further define the Referent field. Line 407 further defines the Attribute field. Lines 409-415 further define the Operator field. Lines 416-432 further define the Value field.

As such, translating a set definition can include for each membership condition statement, an act of decomposing a portion of the accessed set definition into a referent field, an attribute field, an operator field, and a value field that collectively represent the defined membership condition statement (act 204). For example, condition statement 123 includes reference field 123A, attribute field 123B, operator field 123C, and value field 123D. Attribute field 123B can indicate the name of an attribute. Operator field 123C can indicate a relational operator. Value field 123D can indicated a value. Referent field 123A refers either directly to a resource currently being evaluated for membership in the set or to another resource that is related in some way to the resource that is currently being evaluated for membership in the set.

Method 200 includes an act of storing the one or more corresponding membership conditions for use in subsequently determining resource membership in the set (act 205). For example, computer system 101 can store membership conditions 113 at storage device 161. As depicted, membership conditions 113 includes set ID 141 indicating that membership conditions 113 can be used to determine membership in the set defined by set deification 111.

Accordingly, in some embodiments, a filter is translated into membership conditions such that, if at least one membership condition is satisfied for a resource, then the resource matches the filter, and is, therefore, a member of the set. In these embodiments, membership conditions include of one or more membership condition statements, each of which must be true for a resource if the membership condition is to be satisfied for that resource.

As a corollary, an algebra of membership conditions, by which, given one or more membership conditions and the relationships that are to exist among them, one or more resulting membership conditions may be computed. For example, using the notation a membership condition be represented like this: A{1,2}, wherein A is an identifier for the condition, and 1 and 2 identity its statements. Thus, the algebra of membership conditions can be presented as follows:

i. (1 and 2)=A{1,2}

For example, the XPath filter expression, /Person[Name='x'] yields a single membership condition, with two statements, ObjectType='Person' and Name='x.' ii. (1 or 2)=(A{1} or B{2})

For example, the XPath filter expression, /*[Name='x' or Name='y'] yields two membership conditions, each with a single statement. The first membership condition consists of the statement, Name='x' and the second membership condition consists of the statement, Name='y.' iii. (1 and A{2,3})=A{1,2,3}

For example, the XPath filter expression, /Person[Name='x' and Office='y'] yields one membership condition, with three statements: ObjectType='Person,' Name='x' and Office='y.' iv. (1 and (A{2,3} or B{4,5})=(A{1,2,3} or B{1,4,5})

For example, the XPath filter expression, /Person[(Name='x' and Office='y') or (Name='u' and Office='z')] yields two membership conditions that each have three statements. The first membership condition consists of the statements, ObjectType='Person,' Name='x' and Office='y.' The second membership condition consist of the statements, ObjectType='Person,' Name='u' and Office='z.' v. (A{1,2} and B{3,4})=C{1,2,3,4} vi. (1 and (A{2,3} and B{4,5}))=
(A{1,2,3} and B{1,4,5})=(by v.)
C{1,2,3,4,5} vii. (A{1,2} and (B{3,4} or C{5,6}))=
((A{1,2} and B{3,4}) or (A{1,2} and C{5,6}))=(by iii.)
(D{1,2,3,4} or E{1,2,5,6})

viii. ((A{1,2} or B{3,4}) and (C{5,6} or D{7,8}))=
((A{1,2} and C{5,6}) or (A{1,2} and D{7,8}) or (B{3,4} and C{5,6}) or (B{3,4} and D{7,8}))=(by v)
(E{1,2,5,6} or F{1,2,7,8} or G{3,4,5,6} or H{3,4,7,8})

Thus, for any given request to modify the attributes of a resource, one can identify those membership condition statements of which the truth may be affected by the processing of the request. Consequently, one can also identify those membership conditions that may be newly-satisfied, or may not longer be satisfied, once the request to modify the resource has been processed. Thereby, one can determine precisely which sets may contain different members as a result of requested modification to the resource. In this way, the magnitude of the work required to correctly modify the membership of sets given any request to modify a resource is scaled in proportion to the scope of the request and the scope of the set filters.

Some embodiments of the invention use anchors to correctly maintaining the membership of a set as the resources that may belong to those sets are modified. An anchor is a resource that may or may not be a member of a given set, but which has attribute values by which other resources are included in the set. For example, consider the XPath filter, /Person[Manager='X"], which matches any resource of which the value of the Manager attribute identifies a particular resource.

The XPath filter can be expressed in a more verbose, but equivalent form, when resources are uniquely identified by an attribute of theirs called Identifier: /Person[Manager=/*[Identifier='X']/Identifier]. As represented in this more verbose form, any resource that matches the filter does so as long as there is a resource of which the value of the Identifier attribute is X. Should a resource be deleted, or if the value of the resources Identifier attribute is altered, then the values of the Manager attributes that previously had the value X could either be voided, or, more likely, altered. In any event, none of the resources that had previously matched the filter would do so anymore. Thus, the resource of which the Identifier attribute is X serves as an anchor for any resources matching the filter, /Person[Manager='X"].

Accordingly, in addition to using membership conditions to maintain set memberships, embodiments also include identifying resources that might serve as an anchor for any members of the set. Thus, given a request to modify a resource, if that resource is an anchor, then depending on how the anchor is to be modified, the resources that it anchors to a set may or may not still qualify as members.

Embodiments of the invention can be utilized different types of anchors. One type of anchor is a simple anchor. For example, in the XPath filter expression, /Person[Manager='X'], the resource identified by X is a simple anchor. When a resource cannot be altered, only a request to delete the anchor can affect the membership of the resources that it anchors.

Another type of anchor is a filtered anchor. For example, in the XPath filter expression, /Person[Manager=/Person[Campus='Y']/Manager], resources matching the subordinate filter expression, /Person[Campus='Y']/Manager are filtered anchors.

A further type of anchor is a set anchor. For example, in the XPath filter expression, /Set[Member=/Set[Name='Y']/Member], the sets that match the subordinate filter expression, /Set[Name='Y'] serve to anchor the members of the set defined by the entire filter expression.

Figure 1B:
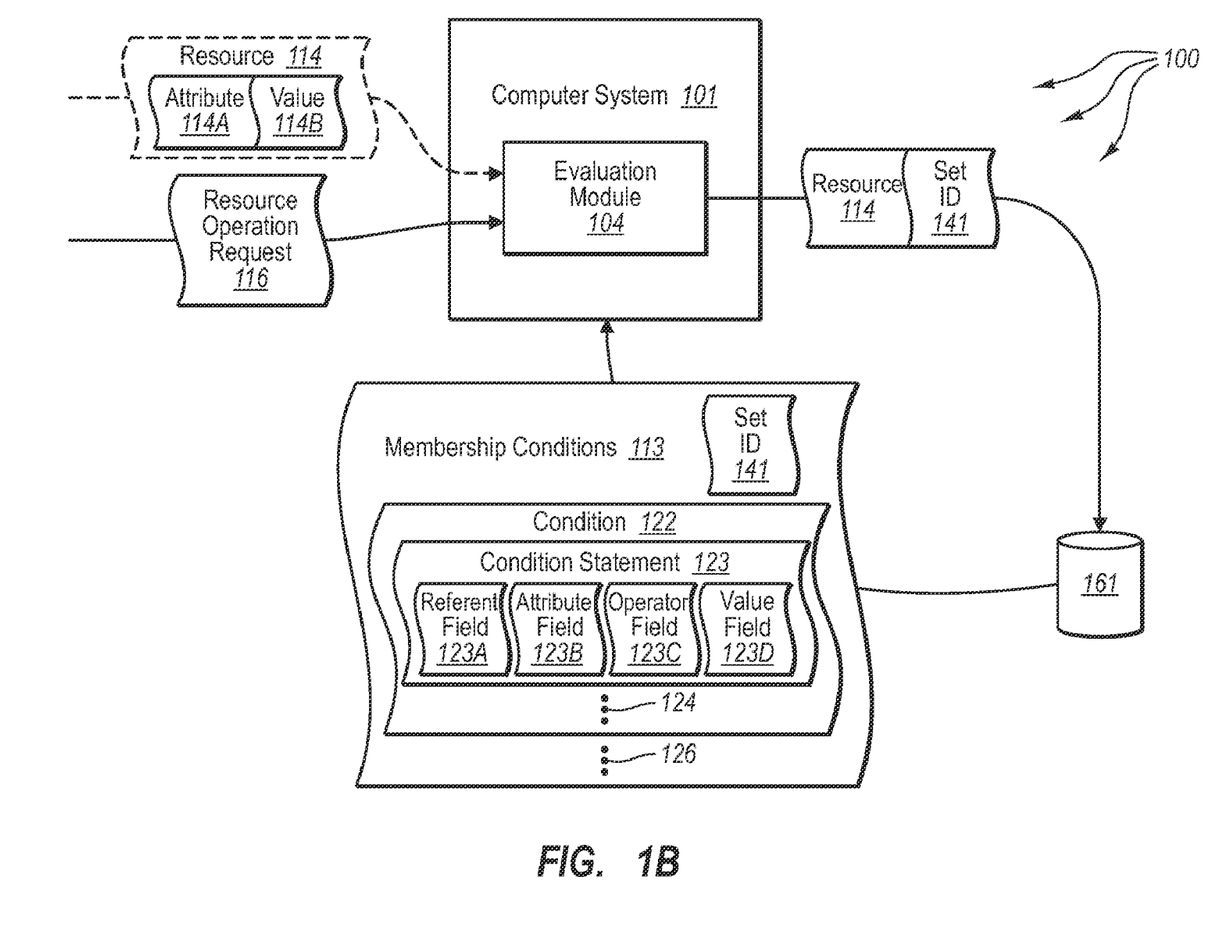
FIG. 1B illustrates an example computer architecture that facilitates determining if an object is included in a set.

FIG. 1B illustrates another example of computer architecture 100 that facilitates determining if an object is included in a set. As depicted in FIG. 1B, computer system 101 includes evaluation module 104. Evaluation module 104 is configured to receive a resource operation request and membership conditions can determine if a resource corresponding to the resource operation request is included in a set corresponding to the membership conditions. Evaluation module 104 is also configured to receive a resource. Thus, embodiments of the invention can include evaluation module 104 receiving a resource or not receiving a resource.

Whether or not evaluation module receives a resource can be based on the resource operation request. When the resource operation request is for modifying a resource, evaluator 104 can receive a resource that is to be modified. On the other hand, when resource operation request is for creating a resource, evaluator 104 does not receive a resource. Computer system 101 instead creates the resource in response to the resource operation request. Evaluator 104 can then evaluate the created resource for set membership.

Evaluation module 104 is further configured to associate a resource with a set ID to indicate that the resource is included in a set corresponding to the set ID.

Figure 3:
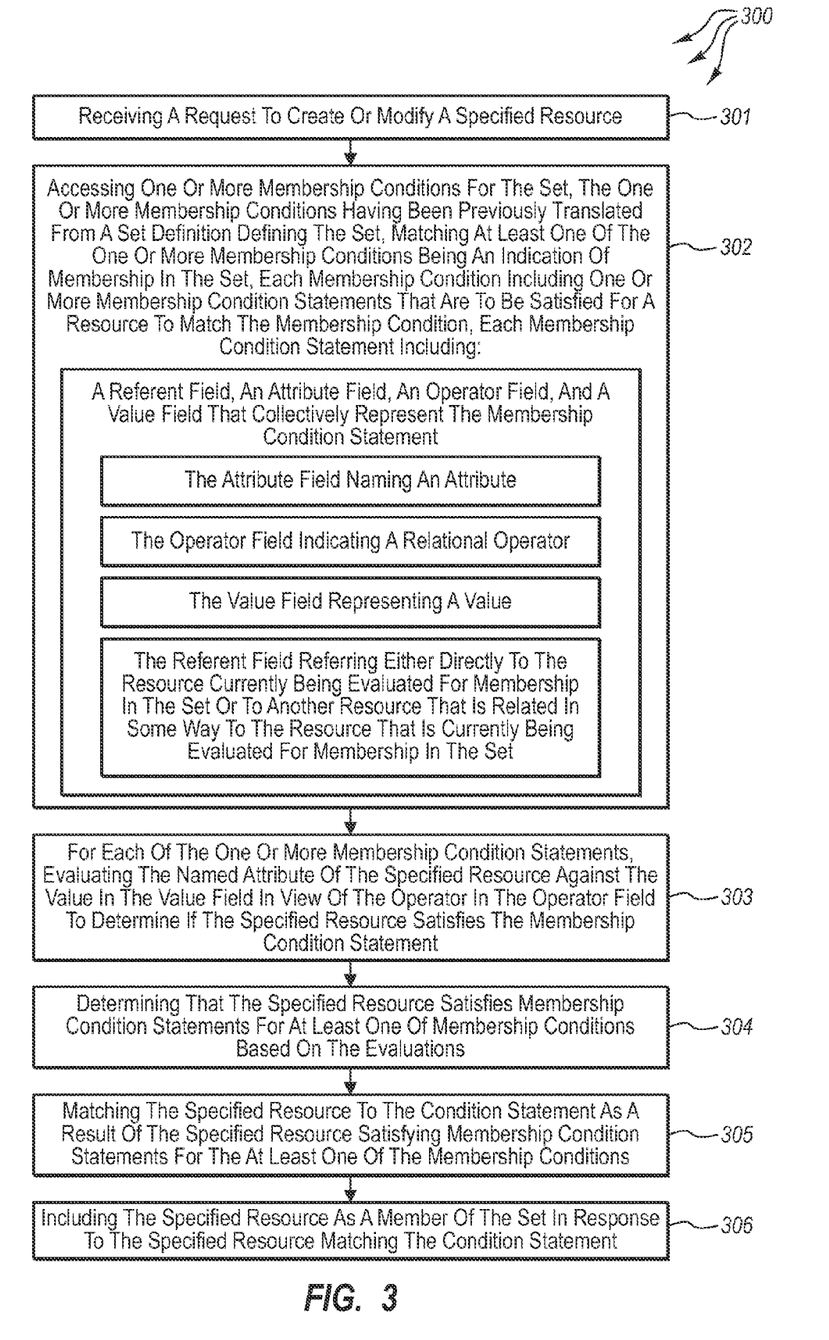
FIG. 3 illustrates a flow chart of an example method for determining if an object is included in a set.

FIG. 3 illustrates a flow chart of an example method 300 for determining if an object is included in a set. Method 300 will be described with respect to the components and data depicted in computer FIG. 1B.

Method 300 includes an act of receiving a request to create or modify a specified resource (act 301). For example, evaluation module 104 can receive resource operation request 116. When resource operation request 116 is a request to modify (including delete) a specified resource, evaluation module 104 can also receive the specified resource (e.g., resource 114) that is to be modified. For example, resource operation request 116 can be a request to change the value of resource 114. Accordingly, evaluation module 104 can receive both resource operation request 116 and resource 114.

Method 300 includes an act of accessing one or more membership conditions for the set, the one or more membership conditions having been previously translated from a set definition defining the set, matching at least one of the one or more membership conditions being an indication of membership in the set, each membership condition including one or more membership condition statements that are to be satisfied for a resource to match the membership condition (act 302). Each membership condition statement includes a referent field, an attribute field, an operator field, and a value field that collectively represent the membership condition statement. The attribute field names an attribute. The operator field indicates a relational operator. The value field representing a value. The referent field refers either directly to the resource currently being evaluated for membership in the set or to another resource that is related in some way to the resource that is currently being evaluated for membership in the set.

For example, evaluation module 104 can receive membership conditions 113 from storage device 161. Membership conditions 113 are for the set defined by set definition 111. As depicted, membership conditions 113 include one or more membership conditions (condition 122 and any other conditions represented by ellipsis 126) that were previously translated (by set translator 102) from set definition 111. Accordingly, matching one of the membership conditions (e.g., condition 122) in membership conditions 113 indicated membership in the set defined by set definition 111 (as associated with set ID 141). Each membership condition in membership conditions 113 includes one or more conditions statements. For example, condition 122 includes condition statement 123 and any other conditions statement represented by ellipsis 124. To satisfy condition 122 a resource is to satisfy condition statement 123 and any other conditions statement represented by ellipsis 124.

As depicted condition statement 123 includes referent field 123A, attributes 123B, operator field 123C, and value field 123D. Attribute field 123B can indicate the name of an attribute (e.g., of resource 114). Operator field 123C can indicate a relational operator (e.g., <, >, <=, =>, ==, ! (invert), a like operation, etc.). Value field 123D can indicated a value. Referent field 123A refers either directly to a resource currently being evaluated for membership in the set or to another resource that is related in some way to the resource that is currently being evaluated for membership in the set. For example, condition statement 123 may be a condition statements translated from /Person[Manager='Bill']. Condition statement 123 can be of the form Manager='Bill' (another condition can be of the form ObjectType='Person'). Thus, referent field 123A refers to the resource being evaluated, the attribute field 122B refers to the 'Manger' attribute of the resource being evaluated, the value field indicates the "=" relational operator, and value field 123D indicates the value of 'Bill'.

Method 300 includes for each of the one or more membership condition statements, an act of evaluating the named attribute of the specified resource against the value in the value field in view of the operator in the operator field to determine if the specified resource satisfies the membership condition statement (act 303). Evaluation module 104 can evaluate existing or newly created resources. For example, for condition statement 123, evaluation module 104 can identify that attribute 114A is the attribute identified by attribute field 123B. Evaluation module 104 can access value 114B and compare value 114B to the value in value field 123D in view of the operator in operator field 123C.

Method 300 includes an act of determining that the specified resource satisfies membership condition statements for at least one of membership conditions based on the evaluations (act 304). For example, evaluation module 104 can determine that resource 114 satisfies condition statements (e.g., conditions statement 123 and any other condition statements represent by ellipsis 124) for condition 122. For example, it may be that attribute 114A is a 'Manager' attribute and value 114B equals 'Bill' (and also that resource 114 is a 'Person' ObjectType).

Method 300 includes an act of matching the specified resource to the condition statement as a result of the specified resource satisfying membership condition statements for the at least one of the membership conditions (act 305). For example, evaluation module 104 can match resource 114 to condition 122 as a result of resource 114 satisfying condition statements (e.g., conditions statement 123 and any other condition statements represent by ellipsis 124) for condition 122. Method 300 includes an act of including the specified resource as a member of the set in response to the specified resource matching the condition statement (act 306). For example, evaluation module 104 can associate resource 114 with set ID 141 to include resource 114 in the set defined by set definition 111. Computer system 1901 can store the association between resource 114 and set ID 141 at storage device 161.

Thus generally, when a resource matches one of the one or more membership conditions for a set, the resource is identified as being included in the set. Membership conditions include one or more membership condition statements. Each membership condition statement in a membership condition is to be satisfied for a resource to match the membership condition.

Embodiments of the invention can include maintaining the membership of a plurality of sets over time. Each of the plurality of sets has a plurality of potential members (i.e., resources that can be included in the sets). Over time, the attributes of potential members can change, new resources can be created, and existing resources can be deleted.

Generally, to determine set membership in a scalable way, the definition of the set is translated into one or more membership conditions. Each membership condition includes statements about the attributes of a resource that are to be true if the resource is to be included in the set. Then, for any given request to modify a resource, the problem of determining which sets the resource will join or leave is scaled down to an evaluation of those membership condition statements that refer to the same attributes of the resource that the request will modify.

For example, a user 'John' can have an identifier hereinafter referred to as 'John's Identifier'. John may be interested in all of the people who report to him (Set A), all of the people who are full-time employees (Set B), all of the people who are just part-time employees (Set C), all of the people who are in his division, which is the research division (Set D), all of distribution lists that he owns (Set E), and all of those distribution lists that are due to expire (Set F). Each set can also have its own identifier, such as, for example, 'Set A's Identifier', 'Set B's Identifier', etc.

Accordingly, John can be define six sets as follows:

Set A, the set of everyone who reports to him: /Person [reportsTo(<John's identifier>)]. Set A can be translated into the following membership conditions:
  i. TargetReferent.ObjectType='Person'; and
  ii. TargetReferent.(Manager,recursively,to)=/*[Identifier=<John's identifier>]/Identifier Set B, the set of full-time employees: /Person [EmploymentStatus='FullTime']. Set B can be translated into the following membership conditions:
  i. TargetReferent.ObjectType='Person'; and
  ii. TargetReferent.EmploymentStatus='FullTime'

Set C, the set of part-time employees: /Person[Identifier !=/Set[Identifier=<Set B's Identifier>]/Member]. Set C can be translated into the following membership conditions:
  i. TargetReferent.Identifier !=/Set[Identifier=<Set B's Identifier>]/Member Set D, the set of everyone in the research division: /Person [Division='Research']. Set D can be translated into the following membership conditions:
  i. Set D: TargetReferent.ObjectType='Person'; and
  ii. TargetReferent.Division='Research'

Set E, the set of distribution lists he owns: /Group [GroupType='DistributionList' and Owner=<John's Identifier>]. Set E can be translated into the following membership conditions:
  i. Set E: TargetReferent.ObjectType='Group';
  ii. TargetReferent.GroupType='Group'; and
  iii. TargetReferent.Owner=<John's Identifier>

Set F, the set of his distribution lists that are due to expire: /Group[Identifier=/Set[Identifier=<Set E's identifier>/Member] and ExpiryDate<=dateAdd(current-date,-14)]. Set E can be translated into the following membership conditions:
  i. TargetReferent.Identifier=/Set[Identifier=<Set E's Identifier>]/Member; and
  ii. TargetReferent.ExpiryDate=dateAdd(current-date,-14)

Subsequent to establishment of the Sets A, B, C, D, E, and F, another user of the system, Jane, requests that the employment status of a third individual, Peter, be switched from part-time to full-time. Of the six sets, Set B and Set C have membership conditions that refer to employment status. Set B's membership conditions expressly refer to employment status. Set C is anchored by Set B, so Set C's membership conditions include those of Set B. Set membership can be efficiently determined after implementing Jane's request by comparing the effect of her request with the membership conditions for Set B. Peter will join Set B, and, because of how Set C is anchored by Set B, Peter will join Set C as well. As such, determining set membership, subsequent to implementing Jane's request, involves two sets and is decided by evaluating the truth of two statements: a) that Peter is a person and b) that Peter's employment status is full-time.

Thus, embodiments of the invention minimize the work that is done to determine which sets a resource may or may not belong to whenever a resource is modified. Accordingly, based on available resources, embodiments of the invention can scale to accommodate larger numbers of sets and larger numbers of potential members of sets.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, a method for formulating a collection of set membership conditions for a set, the method comprising:
  an act of accessing a set definition for a specified set, the set definition defining what resources are to be included in the specified set;
  an act of accessing a membership condition grammar, the membership condition grammar generally indicating how to translate a set definition for a set into membership conditions indicative of membership in the set;
  an act of translating the accessed set definition into one or more corresponding membership conditions defined in accordance with the membership condition grammar, each membership condition including one or more membership condition statements, each membership condition statement defining a condition about a resource's attributes that is to be true for the resource to be considered for membership in the set, including for each membership condition statement:
    an act of decomposing a portion of the accessed set definition into a referent field, an attribute field, an operator field, and a value field that collectively represent the defined membership condition statement, each of the referent field, attribute field, operator field, and value field being defined within the membership condition grammar as:

<Referent>::=<Referent Reference><Attribute>,
<Attribute>::=a name of an attribute of a resource identified by an expression to its left,
<Operator>::=<Relational Operator>|<Inverted Operator>, and
<Value>::=<Literal Value>|<Function Value>|<De-referenced Value>, and further:
the attribute field naming an attribute,
the operator field indicating a relational operator,
the value field representing a value,
the referent field indicating a referent, the referent referring either directly to the resource currently being evaluated for membership in the set or to another resource that is related in some way to the resource that is currently being evaluated for membership in the set; and an act of storing the one or more corresponding membership conditions for use in subsequently determining resource membership in the set.

2. The method as recited in claim 1, wherein the act of accessing a set definition for a specified set comprises an act of accessing an XPath statement.

3. The method as recited in claim 1, wherein the act of accessing a membership condition grammar comprises an act of accessing a membership grammar that defines membership condition statements to include a referent field, an attribute field, an operator field, and a value field.

4. The method as recited in claim 1, wherein the act of translating the accessed set definition into one or more corresponding membership conditions comprises an act of translating the accessed set definition into at least one membership condition that includes a plurality of condition statements.

5. The method as recited in claim 1, wherein the act of translating the accessed set definition into one or more corresponding membership conditions comprises an act of translating an XPath statement into at least one membership condition.

6. The method as recited in claim 1, wherein the act of decomposing a portion of the accessed set definition comprises an act of decomposing an XPath filter into a referent field, an attribute field, an operator field, and a value field that collectively represent the defined membership condition statement.

7. The method as recited in claim 1, wherein the operator field indicates a relational operator selected from among: <, >, <=, =>, ==, and !.

8. The method as recited in claim 1, wherein the value field represents a value selected from among: a string value, an integer value, a Boolean value, a time value, a reference value, and a function value.

9. The method as recited in claim 1, wherein the referent value field indicates that the named attribute of the referent refers to an attribute of the resource for which the truth of the statement is currently being evaluated.

10. The method as recited in claim 1, wherein the act of translating the accessed set definition into one or more corresponding membership conditions defined in accordance with the membership condition grammar comprises an act of translating the accessed set definition in accordance with an algebra of membership conditions.

11. At a computer system including one or more processors and system memory, a method for determining if a reference that is to be created or modified is a member of a set, the method comprising:

an act of receiving a resource request corresponding to a specified resource;

an act of accessing one or more membership conditions for the set, the one or more membership conditions having been previously translated from a set definition defining the set, matching at least one of the one or more membership conditions being an indication of membership in the set, each membership condition including one or more membership condition statements that are to be satisfied for a resource to match the membership condition, each membership condition statement including:
a referent field, an attribute field, an operator field, and a value field that collectively represent the membership condition statement, each of the referent field, attribute field, operator field, and value field being defined within the membership condition grammar as:

<Referent>::=<Referent Reference><Attribute>,
<Attribute>::=a name of an attribute of a resource identified by an expression to its left,
<Operator>::=<Relational Operator>|<Inverted Operator>, and
<Value>::=<Literal Value>|<Function Value>|<De-referenced Value>, and further:
the attribute field naming an attribute,
the operator field indicating a relational operator,
the value field representing a value,
the referent field indicating a referent, the referent referring either directly to the resource currently being evaluated for membership in the set or to another resource that is related in some way to the resource that is currently being evaluated for membership in the set;

for each of the one or more membership condition statements, an act of evaluating the named attribute of the specified resource against the value in the value field in view of the operator in the operator field to determine if the specified resource satisfies the membership condition statement;

an act of determining that the specified resource satisfies membership condition statements for at least one of membership conditions based on the evaluations;

an act of matching the specified resource to the condition statement as a result of the specified resource satisfying membership condition statements for the at least one of the membership conditions; and an act of including the specified resource as a member of the set in response to the specified resource matching the condition statement.

12. The method as recited in claim 11, wherein the act of receiving a resource request corresponding to a specified resource comprises an act of receiving a request to modify a resource.

13. The method as recited in claim 11, wherein the act of receiving a resource request corresponding to a specified resource comprises an act of receiving a request to create a resource.

14. The method as recited in claim 11, wherein the act of accessing one or more membership conditions for the set, the one or more membership conditions having been previously translated from a set definition defining the set comprises an act of accessing one or more membership conditions previously translated from an XPath statement.

15. The method as recited in claim 11, wherein the operator field indicates a relational operator selected from among: <, >, <=, =>, ==, and !.

16. The method as recited in claim 11, wherein the value field represents a value selected from among: a string value, an integer value, a Boolean value, a time value, a reference value, and a function value.

17. The method as recited in claim 11, wherein the referent value field indicates that the named attribute of the referent refers to an attribute of the resource for which the truth of the statement is currently being evaluated.

18. The method as recited in claim 11, wherein the act of evaluating the named attribute of the specified resource against the value in the value field in view of the operator in the operator field comprises an act of evaluating the named attribute of the specified resource through reference to a related resource references in the referent field.

19. The method as recited in claim 11, wherein the act of including the specified resource as a member of the set comprises an act of associating the resource with the set ID for the set definition defining the set and further comprising:
an act of storing the association between the resource and the set ID at a physical storage device.

20. A computer system for evaluating set membership, the computer system comprising:
one or more processors;
system memory; and
one or more physical storage media, the physical storage media having stored thereon computer-executable instructions representing a translation module for formulating a collection of set membership conditions for a set, the translation module configured further include a decomposition module for decomposing XPath statements into set membership condition statements, the translation module and decomposition module configured to:
access a set definition for a specified set, the set definition defining what resources are to be included in the specified set;
access a membership condition grammar, the membership condition grammar generally indicating how to translate a set definition for a set into membership conditions indicative of membership in the set;
translate the accessed set definition into one or more corresponding membership conditions defined in accordance with the membership condition grammar, each membership condition including one or more membership condition statements, each membership condition statement defining a condition about a resource's attributes that is to be true for the resource to be considered for membership in the set, including for each membership condition statement:
decomposing a portion of the accessed set definition into a referent field, an attribute field, an operator field, and a value field that collectively represent the defined membership condition statement, each of the referent field, attribute field, operator field, and value field being defined within the membership condition grammar as:
<Referent>::=<Referent Reference><Attribute>,
<Attribute>::=a name of an attribute of a resource identified by an expression to its left,
<Operator>::=<Relational Operator>|<Inverted Operator>, and
<Value>::=<Literal Value>|<Function Value>|<De-referenced Value>,
and further:
the attribute field naming an attribute,
the operator field indicating a relational operator,
the value field representing a value,
the referent field indicating a referent, the referent referring either directly to the resource currently being evaluated for membership in the set or to another resource that is related in some way to the resource that is currently being evaluated for membership in the set; and
store the one or more corresponding membership conditions for use in subsequently determining resource membership in the set; and
the one or more physical storage media having stored thereon computer-executable instructions representing an evaluation module, the evaluation module configured to:
receive a resource request corresponding to a specified resource;
access one or more membership conditions for the set, the one or more membership conditions having been previously translated from a set definition defining the set, matching at least one of the one or more membership conditions being an indication of membership in the set, each membership condition including one or more membership condition statements that are to be satisfied for a resource to match the membership condition, each membership condition statement including:
a referent field, an attribute field, an operator field, and a value field that collectively represent the membership condition statement,
the attribute field naming an attribute,
the operator field indicating a relational operator,
the value field representing a value,
the referent field indicating a referent, the referent referring either directly to the resource currently being evaluated for membership in the
set or to another resource that is related in some way to the resource that is currently being evaluated for membership in the set;
for each of the one or more membership condition statements, evaluate the named attribute of the specified resource against the value in the value field in view of the operator in the operator field to determine if the specified resource satisfies the membership condition statement;
determine that the specified resource satisfies membership condition statements for at least one of membership conditions based on the evaluations;
match the specified resource to the condition statement as a result of the specified resource satisfying membership condition statements for the at least one of the membership conditions; and
include the specified resource as a member of the set in response to the specified resource matching the condition statement.

* * * * *